(12) United States Patent
Nishi

(10) Patent No.: US 6,519,668 B1
(45) Date of Patent: Feb. 11, 2003

(54) ADDITIONAL EXTENSION DEVICE HAVING UNIVERSAL APPLICABILITY

(75) Inventor: Hidefumi Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/309,595

(22) Filed: May 11, 1999

(30) Foreign Application Priority Data

May 13, 1998 (JP) ............................................ 10-129356

(51) Int. Cl.$^7$ ................................................ G06F 13/00
(52) U.S. Cl. ............................. 710/300; 710/2; 710/62
(58) Field of Search ................................. 710/300, 301, 710/104, 2, 8, 62, 63; 345/503, 520

(56) References Cited

U.S. PATENT DOCUMENTS 5,768,568 A * 6/1998 Inui et al. ..................... 710/16
5,854,905 A * 12/1998 Garney ........................ 710/104
6,081,891 A * 6/2000 Park .............................. 713/2

FOREIGN PATENT DOCUMENTS

JP  62-249250  10/1988

* cited by examiner

Primary Examiner—Peter Wong
Assistant Examiner—X. Chung-Trans
(74) Attorney, Agent, or Firm—Arent Fox Kintner Plotkin and Kahn

(57) ABSTRACT

A device for extending functions of a computer connected thereto adds a new function to functions of an existing extension unit. The device includes a non-volatile memory and a new extension unit connected to the non-volatile memory and capable of being connected to the computer via a bus and to the existing extension unit. The new extension unit transfers what is stored in the non-volatile memory to the computer when the computer requests attribute information of the existing extension unit.

2 Claims, 6 Drawing Sheets

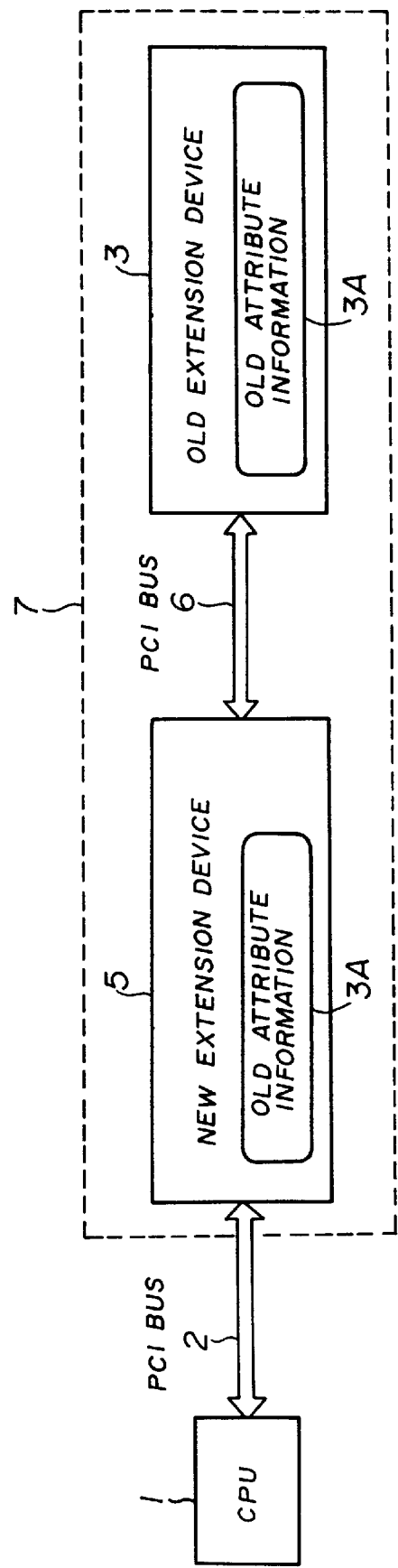

ADDITIONAL EXTENSION DEVICE HAVING UNIVERSAL APPLICABILITY

BACKGROUND OF THE INVENTION

1. Field of the Invention

The present invention relates to a device for adding a new function to a computer so as to extend functions of the computer.

2. Description of the Related Art

FIG. 5 is a block diagram showing a skeleton structure of a personal computer.

A configuration of FIG. 5 includes a CPU 1, a PCI bus 2, and an extension device 3. The extension device 3 is connected to the PCI bus 2 for the purpose of extending functions of the personal computer.

The extension device 3 adds functions thereof to the personal computer. When a new function needs to be added to the extension device 3 to create a new extension device having the new function and the existing functions, two different schemes are available to achieve this object. In a first scheme, a new extension device 4 is simply a modified version of the extension device 3 as shown in FIG. 6. In a second scheme, a new extension device 7 is a combination of the old extension device 3 and a new extension device 5 connected together via a PCI bus 6, as shown in FIG. 7.

The extension device 4 of the first scheme is generated by modifying the old extension device 3, so that the extension device 4 has new attribute information 4A assigned thereto. The extension device 7 of the second scheme includes the old extension device 3, so that the new extension device 5 is provided with attribute information 3A of the old extension device 3.

Since the extension device 4 of the first scheme is created by modifying the extension device 3, development of the extension device 4 involves redesigning of a entire device configuration. This results in a lengthy development period.

The extension device 7 of the second scheme is a combination of the old extension device 3 and the new extension device 5, so that the extension device 3 can be used as it is without making any modification to its design. Development of the extension device 7 involves only the development of the new extension device 5, and, thus, can be finished in a shorter time period. The configuration of the second scheme, however, has a drawback as lacking universal applicability in that new functions need to be specially adapted to the old extension device 3.

Accordingly, there is a need for an extension device which can provide both old functions of an old extension device and new functions of a new extension device, and can offer universal applicability while requiring a relatively short time period for design and development.

SUMMARY OF THE INVENTION

Accordingly, it is a general object of the present invention to provide an extension device which can satisfy the need as described above.

It is another and more specific object of the present invention to provide an extension device which can provide both old functions of an old extension device and new functions of a new extension device, and can offer universal applicability while requiring a relatively short time period for design and development.

In order to achieve the above objects according to the present invention, a device for extending functions of a computer connected thereto by adding a new function to functions of an existing extension device includes a non-volatile memory that is a rewrite-enable memory, and a new extension device connected to the non-volatile memory and capable of being connected to the computer via a bus and to the existing extension device, said new extension device transferring what is stored in said non-volatile memory to the computer when the computer requests attribute information of the existing extension device.

Since the existing extension device described above can be used without making any modification to its design, development of the whole device involves only the development of the new extension device. This results in the development being completed in a relatively short time period. Further, the device of the present invention is provided with the write-enable memory. When there is a need to replace the existing extension device with another extension device, modifying the attribute information in the write-enable memory is all that is necessary to cope with the new configuration. Therefore, universal applicability is insured.

According to another aspect of the present invention, a device for extending functions of a computer connected thereto by adding a new function to functions of an existing extension device includes a bus capable of having the existing extension device connected thereto, and a new extension device connected to the bus and capable of being connected to the computer via another bus, said new extension device transferring a request for attribute information sent from the computer to said existing extension device, and transferring the attribute information sent from the existing extension device to the computer.

Since the existing extension device described above can be used without making any modification to its design, development of the whole device involves only the development of the new extension device. This results in the development being completed in a relatively short time period. Further, the new extension device issues a request for attribute information to the existing extension device when the host computer requests the attribute information of the existing extension device, and receives the attribute information from the existing extension device to send it to the host computer on behalf of the existing extension device. Because of this configuration, even when another extension device having different attribute information is provided in place of the existing extension device, no design change is necessary in the circuit of the new extension device. Therefore, universal applicability is insured.

Other objects and further features of the present invention will be apparent from the following detailed description when read in conjunction with the accompanying drawings.

BRIEF DESCRIPTION OF THE DRAWINGS

FIG. 7 is a block diagram showing a relevant portion of a personal computer and another related-art extension device connected to the personal computer.

DESCRIPTION OF THE PREFERRED EMBODIMENTS

In the following, embodiments of the present invention will be described with reference to the accompanying drawings.

Figure 1:
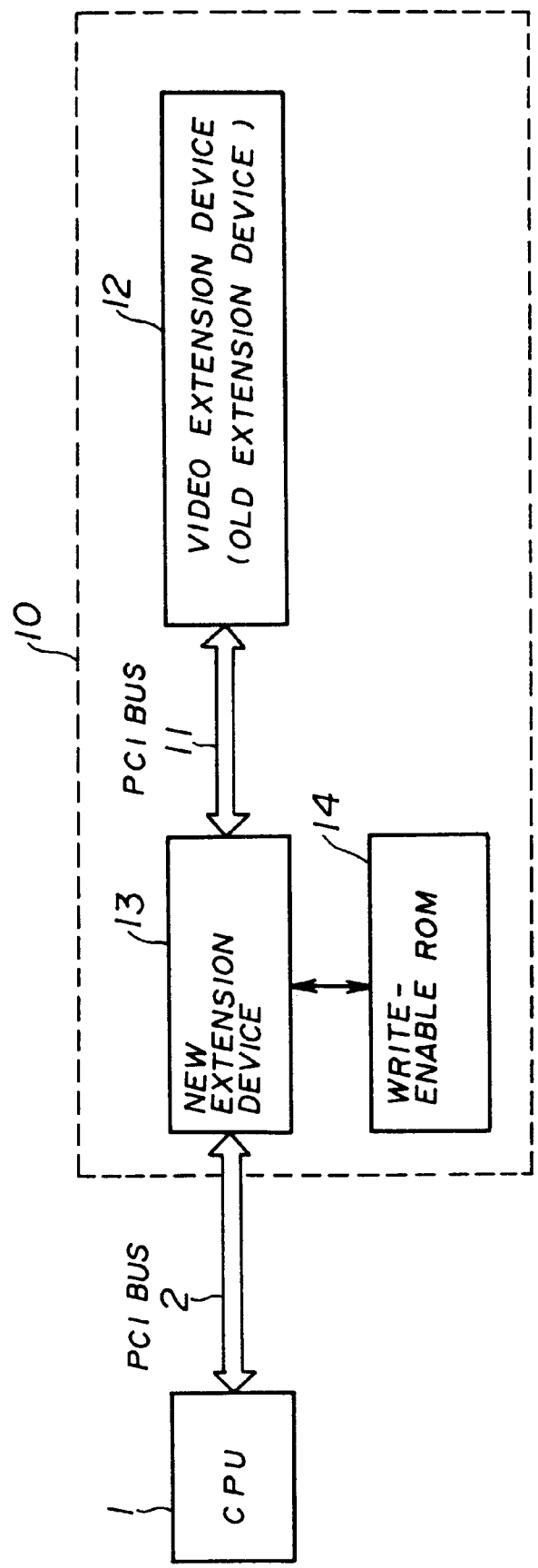
FIG. 1 is a block diagram showing a relevant portion of a personal computer and an extension device according to a first embodiment of the present invention.

FIG. 1 is a block diagram showing a relevant portion of a personal computer and an extension device according to a first embodiment of the present invention.

Figure 5:
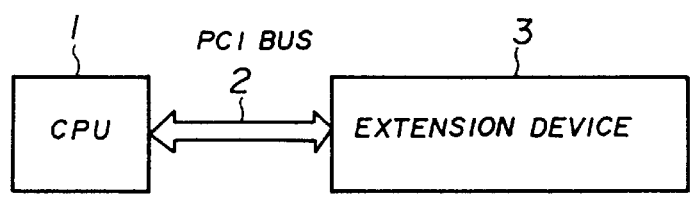
FIG. 5 is a block diagram showing a skeleton structure of a personal computer.
Figure 6:
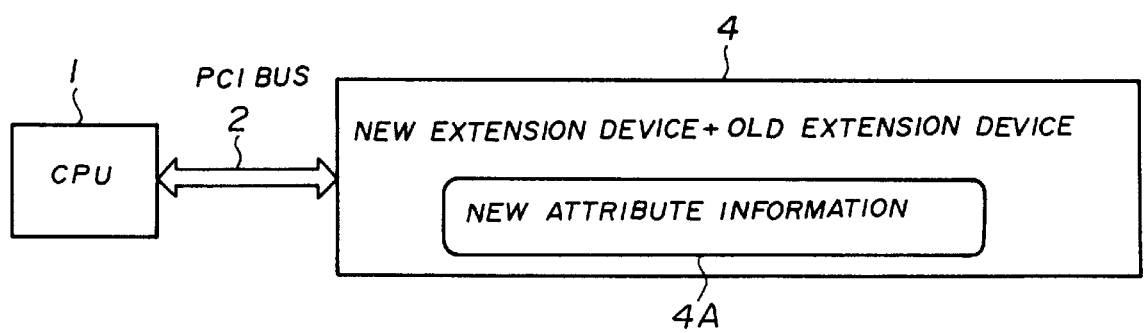
FIG. 6 is a block diagram showing a relevant portion of a personal computer and a related-art extension device connected to the personal computer.

In FIG. 1, the same elements as those of FIG. 5 are referred to by the same numerals, and a duplicate description thereof will be omitted.

An extension device 10 of the first embodiment includes a PCI bus 11 and a video extension device 12 connected to the PCI bus 11. The video extension device 12 is not provided with a function to calculate coordinates for 3D graphics, and is treated as an old extension device in this example.

The extension device 10 further includes a new extension device 13 and a write-enable ROM 14. The new extension device 13 is connected to the PCI bus 11, and is provided with a new function to calculate coordinates for 3D graphics. The write-enable ROM 14 stores attribute information of the old extension device, and is accessed by the new extension device 13.

In the extension device 10 of the first embodiment of the present invention, the write-enable ROM 14 stores the attribute information of the video extension device 12. When the CPU 1 requests the attribute information of the video extension device 12, the new extension device 13 reads the attribute information of the video extension device 12 from the write-enable ROM 14, and sends it to the CPU 1 on behalf of the video extension device 12.

In this manner, the extension device 10 of the first embodiment of the present invention includes the video extension device 12 as an old extension device and the new extension device 13 for calculating coordinates for 3D graphics, and, thus, is in possession of old functions of the video extension device 12 and the new function of the new extension device 13.

Since the video extension device 12 can be used without making any modification to its design, development of the extension device 10 involves only the development of the new extension device 13. This results in the development being completed in a relatively short time period.

Further, the extension device 10 of the first embodiment of the present invention is provided with the write-enable ROM 14. When there is a need to provide another video extension device in place of the video extension device 12, modifying the attribute information in the write-enable ROM 14 is all that is necessary to cope with the new configuration. Therefore, universal applicability is insured.

Figure 2:
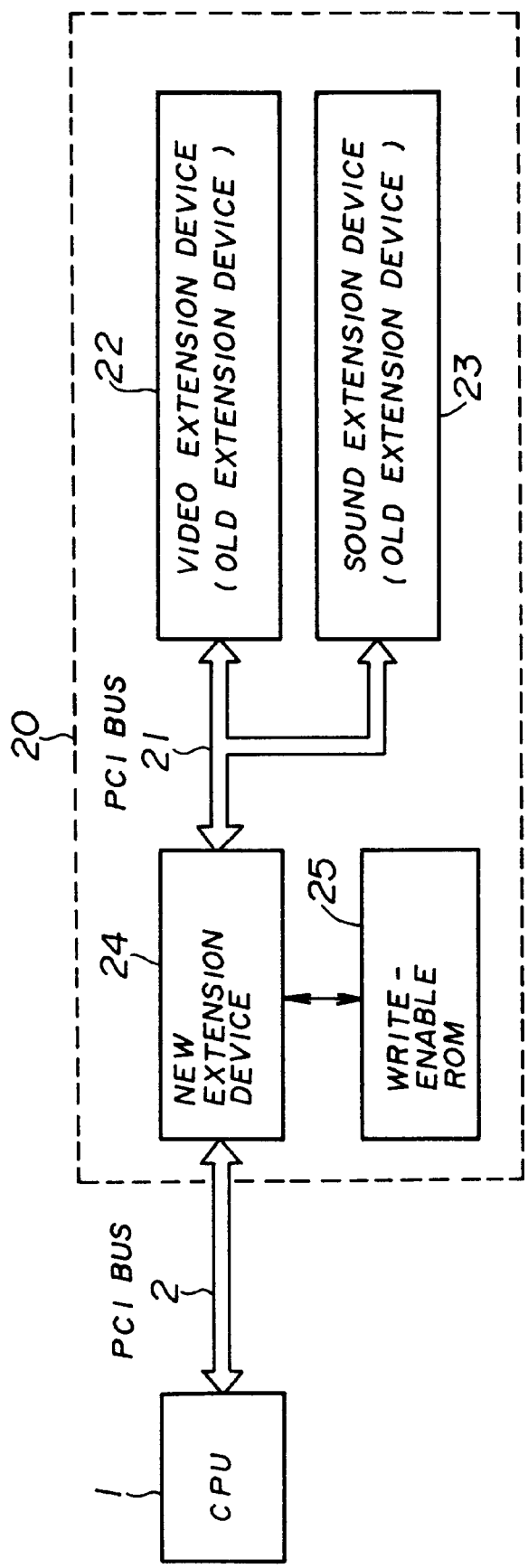
FIG. 2 is a block diagram showing a relevant portion of a personal computer and an extension device according to a second embodiment of the present invention.

FIG. 2 is a block diagram showing a relevant portion of a personal computer and an extension device according to a second embodiment of the present invention.

In FIG. 2, the same elements as those of FIG. 5 are referred to by the same numerals, and a duplicate description thereof will be omitted.

An extension device 20 of the second embodiment includes a PCI bus 21, a video extension device 22 connected to the PCI bus 21, and a sound extension device 23 also connected to the PCI bus 21. The video extension device 22 is not provided with a function to calculate coordinates for 3D graphics, and is treated as an old extension device in this example. The sound extension device 23 does not possess a function to calculate coordinates for 3D sound, and is an old extension device.

The extension device 20 further includes a new extension device 24 and a write-enable ROM 25. The new extension device 24 is connected to the PCI bus 21, and is provided with a new function to calculate coordinates for 3D graphics and a new function to calculate coordinates for 3D sound. The write-enable ROM 25 stores attribute information of the old extension devices, and is accessed by the new extension device 24.

In the extension device 20 of the second embodiment of the present invention, the write-enable ROM 25 stores the attribute information of the video extension device 22 and the attribute information of the sound extension device 23.

When the CPU 1 requests the attribute information of the video extension device 22 or the attribute information of the sound extension device 23, the new extension device 24 reads the attribute information of the video extension device 22 or the attribute information of the sound extension device 23 from the write-enable ROM 25, and sends it to the CPU 1 on behalf of the video extension device 22 or the sound extension device 23.

In this manner, the extension device 20 of the second embodiment of the present invention includes the video extension device 22 and the sound extension device 23 as old extension devices, and further includes the new extension device 24 for calculating coordinates for 3D graphics and 3D sounds, and, thus, is in possession of old functions of the video extension device 22 and the sound extension device 23 as well as the new functions of the new extension device 24.

Since the video extension device 22 and the sound extension device 23 can be used without making any modification to their designs, development of the extension device 20 involves only the development of the new extension device 24. This results in the development being completed in a relatively short time period.

Further, the extension device 20 of the second embodiment of the present invention is provided with the write-enable ROM 25. When there is a need to provide another video extension device in place of the video extension device 22 or to provide another sound extension device in place of the sound extension device 23, modifying the attribute information in the write-enable ROM 25 is all that is necessary to cope with the new configuration. Therefore, universal applicability is insured.

Figure 3:
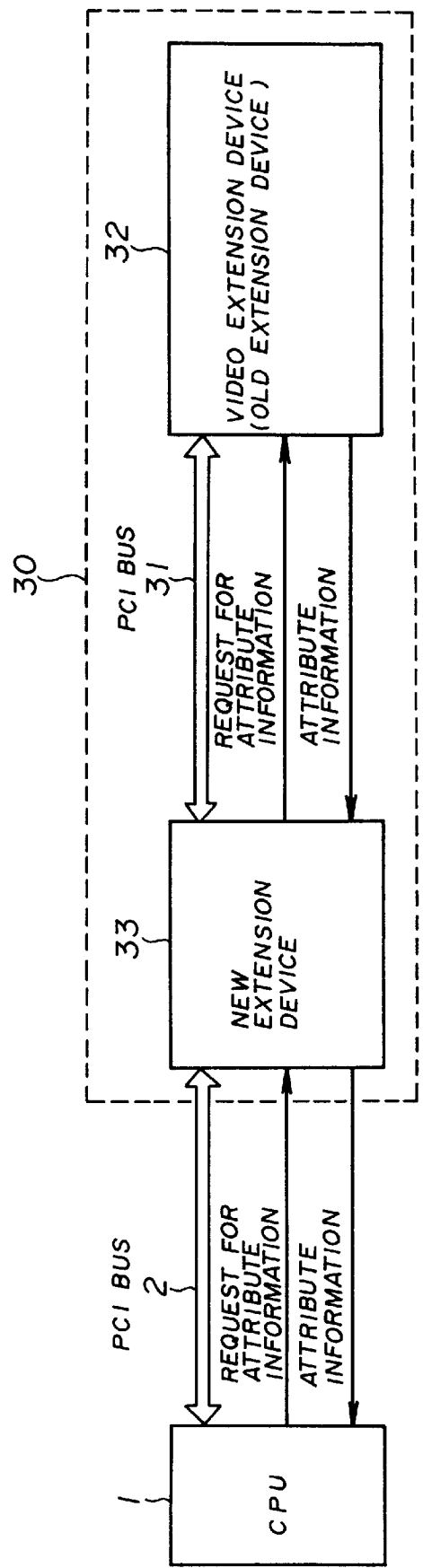
FIG. 3 is a block diagram showing a relevant portion of a personal computer and an extension device according to a third embodiment of the present invention.

FIG. 3 is a block diagram showing a relevant portion of a personal computer and an extension device according to a third embodiment of the present invention.

In FIG. 3, the same elements as those of FIG. 5 are referred to by the same numerals, and a duplicate description thereof will be omitted.

An extension device 30 of the third embodiment includes a PCI bus 31 and a video extension device 32 connected to the PCI bus 31. The video extension device 32 is not provided with a function to calculate coordinates for 3D graphics, and is treated as an old extension device in this example. The extension device 30 further includes a new extension device 33. The new extension device 33 is connected to the PCI bus 31, and is provided with a new function to calculate coordinates for 3D graphics.

When the CPU 1 requests the attribute information of the video extension device 32, the new extension device 33 issues a request for the attribute information to the video extension device 32 on behalf of the CPU 1. The new extension device 33 then receives the attribute information from the video extension device 32, and sends it to the CPU 1 on behalf of the video extension device 32.

In this manner, the extension device 30 of the third embodiment of the present invention includes the video extension device 32 as an old extension device and the new extension device 33 for calculating coordinates for 3D graphics, and, thus, is in possession of old functions of the video extension device 32 and the new function of the new extension device 33.

Since the video extension device 32 can be used without making any modification to its design, development of the extension device 30 involves only the development of the new extension device 33. This results in the development being completed in a relatively short time period.

Further, the new extension device 33 issues a request for attribute information to the video extension device 32 when the CPU 1 requests the attribute information of the video extension device 32, and receives the attribute information from the video extension device 32 to send it to the CPU 1 on behalf of the video extension device 32. Because of this configuration, even when another video extension device having different attribute information is provided in place of the video extension device 32, no design change is necessary in the circuit of the new extension device. Therefore, universal applicability is insured.

Figure 4:
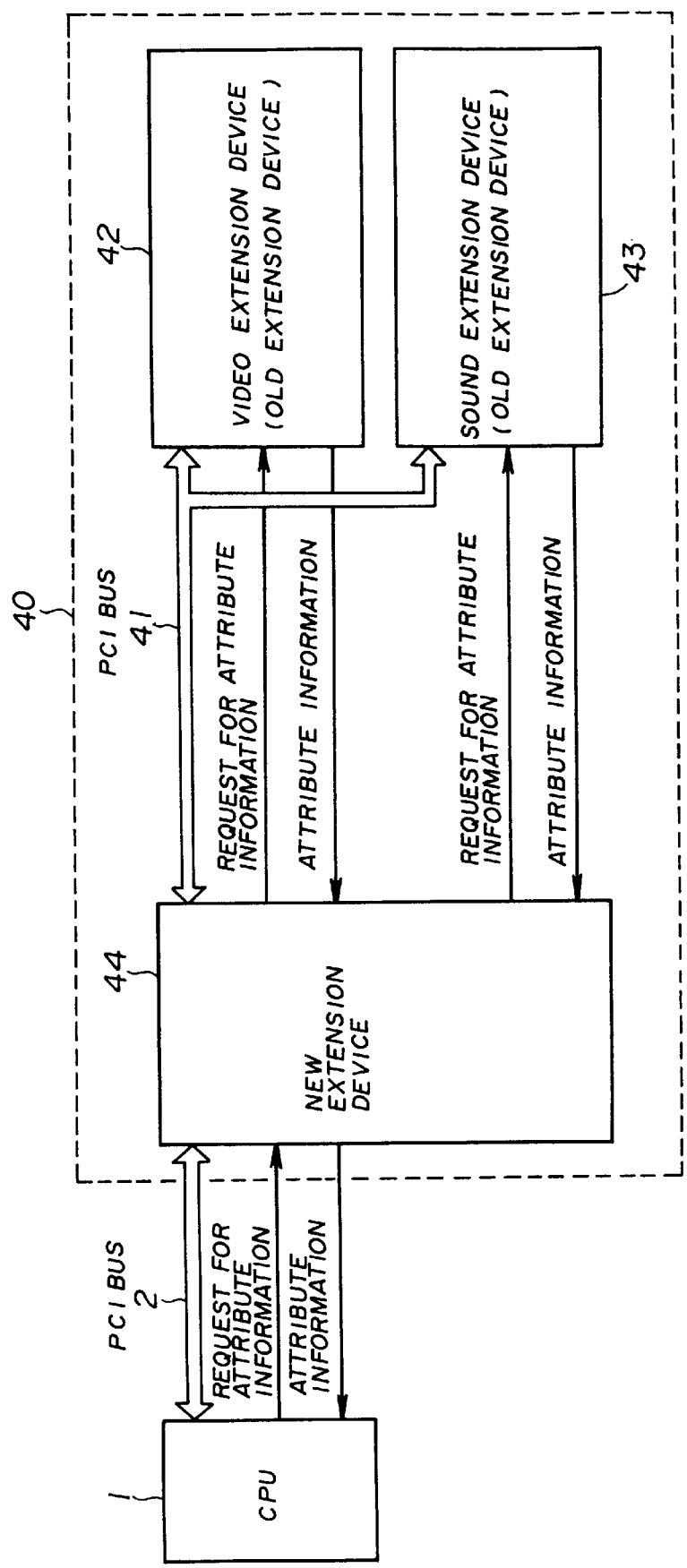
FIG. 4 is a block diagram showing a relevant portion of a personal computer and an extension device according to a fourth embodiment of the present invention.

FIG. 4 is a block diagram showing a relevant portion of a personal computer and an extension device according to a fourth embodiment of the present invention.

FIG. 4, the same elements as those of FIG. 5 are referred to by the same numerals, and a duplicate description thereof will be omitted.

An extension device 40 of the fourth embodiment includes a PCI bus 41, a video extension device 42 connected to the PCI bus 41, and a sound extension device 43 also connected to the PCI bus 41. The video extension device 42 is not provided with a function to calculate coordinates for 3D graphics, and is treated as an old extension device in this example. The sound extension device 43 does not possess a function to calculate coordinates for 3D sound, and is an old extension device.

The extension device 40 further includes a new extension device 44. The new extension device 44 is provided with a new function to calculate coordinates for 3D graphics and a new function to calculate coordinates for 3D sound.

When the CPU 1 requests the attribute information of the video extension device 42 or the attribute information of the sound extension device 43, the new extension device 44 issues a request for the attribute information to the video extension device 42 or the sound extension device 43 on behalf of the CPU 1. The new extension device 44 then receives the attribute information from the video extension device 42 or the sound extension device 43, and sends it to the CPU 1 on behalf of the video extension device 42 or the sound extension device 43.

In this manner, the extension device 40 of the fourth embodiment of the present invention includes the video extension device 42 and the sound extension device 43 as old extension devices as well as the new extension device 44 for calculating coordinates for 3D graphics and 3D sound, and, thus, is in possession of old functions of the video extension device 42 and the sound extension device 43 and the new functions of the new extension device 44.

Since the video extension device 42 and the sound extension device 43 can be used without making any modification to their designs, development of the extension device 40 involves only the development of the new extension device 44. This results in the development being completed in a relatively short time period.

Further, the new extension device 44 issues a request for attribute information to the video extension device 42 or to the sound extension device 43 on behalf of the CPU 1 when the CPU 1 requests the attribute information of the video extension device 42 or the attribute information of the sound extension device 43, and receives the attribute information from the video extension device 42 or the sound extension device 43 to send it to the CPU 1 on behalf of the video extension device 42 or the sound extension device 43. Because of this configuration, even when another video or sound extension device having different attribute information is provided in place of the video extension device 42 or the sound extension device 43, no design change is necessary in the circuit of the new extension device. Therefore, universal applicability is insured.

Further, the present invention is not limited to these embodiments, but various variations and modifications may be made without departing from the scope of the present invention.

The present application is based on Japanese priority application No. 10-129356 filed on May 13, 1998, with the Japanese Patent Office, the entire contents of which are hereby incorporated by reference.

What is claimed is:

1. A device for extending functions of a computer connected thereto, comprising:

an existing extension unit;

a new extension unit which is connected to said existing extension unit via a first bus and is capable of being connected to the computer via a second bus, said new extension unit adding a new function to functions of said existing extension unit; and a non-volatile memory which is a rewrite-enable memory and is connected to said new extension unit, said non-volatile memory storing attribute information of said existing extension unit, wherein when the computer requests the attribute information of said existing extension unit, said new extension unit transfers the attribute information of said existing extension unit stored in said non-volatile memory to the computer.

2. A device for extending functions of a computer connected thereto, comprising:

an existing extension unit; and a new extension unit which is connected to said existing extension unit via a first bus and is capable of being connected to the computer via a second bus, said new extension unit adding a new function to functions of said existing extension unit, wherein when the computer requests attribute information of said existing extension unit, said new extension unit transfers a request for the attribute information sent from the computer to said existing extension unit, receives the attribute information output from said existing extension unit, and transfers the received attribute information of said existing extension unit to the computer.

\* \* \* \* \*